3,038,836
ANTHELMINTIC COMPOSITIONS CONTAINING DIETHYLTOLUAMIDE AND METHOD OF USE

Geoffrey D. L. Woodard and Marie W. Woodard, Herndon, Va., assignors to Hercules Powder Company, Wilmington, Del., a corporation of Delaware
No Drawing. Filed Dec. 13, 1960, Ser. No. 75,486
9 Claims. (Cl. 167—53)

This invention relates to veterinary vermifuges and more particularly to compositions containing diethyltoluamide for deworming of animals infested with parasitic worms.

In accordance with the present invention, it has been found that animals infested with parasitic worms in the intestinal tract are freed of these parasites by introducing per os into the animal's intestinal tract diethyltoluamide in sufficient amount and dosage to repel the parasites until they are substantially completely eliminated.

The diethyltoluamide is introduced in any convenient manner along with an inert carrier. The carrier should be nontoxic and permit the diethyltoluamide to be carried beyond the stomach for release in the intestinal tract. Digestible carriers for this purpose are well known in the pharmaceutical field as capsules and cachets. Hard gelatin capsules as well as soft gelatin capsules provide excellent nontoxic, edible, substantially digestible carriers for this purpose. These are particularly well suited for encapsulating liquid diethyl m-toluamide particularly when small amounts of diethyl o-toluamide and diethyl p-toluamide are present and depress the freezing point of the individual isomers. The diethyltoluamide may also be dispersed with edible solids or excipients and made into tablets or pills and coated with an enteric coating which provides a digestible container for the active material.

The compositions may be made up as articles of sufficiently small size for ease of administration and may be of smaller size than would constitute a single dose. Containers in which from 0.01 to 100 grams of diethyltoluamide are enclosed provide a wide range for selection according to the dose based on animal weight.

The treatment of this invention is particularly effective in the elimination of tapeworms (*Taenia pisiformis* and *Dipylidium caninum*) in dogs. A group of dogs showing heavy infestation of tapeworms was treated by introducing per os 0.15 ml. diethyltoluamide in hard gelatin capsules per kg. of dog weight per day for three consecutive days, and checks were made on the animals' weight while being fed normally, and necroscopic examination in some cases was then made for worms. The results of this method of carrying out the invention are tabulated below.

| Dog | Sex | Wt. (Kg.) at Worming | Daily Dosage, Ml. | Total Three Day Dosage | Results Worms and Wts. After— | |
|---|---|---|---|---|---|---|
| | | | | | 6 wks. | 8 wks. (wt.) |
| 716 | M | 8.7 | 1.30 | 3.90 | [1] 0 | |
| 729 | F | 10.7 | 1.60 | 4.80 | | 0 (12.1 kg.) |
| 828 | M | 7.5 | 1.12 | 3.36 | | 0 (10.6 kg.) |
| 682 | M | 12.5 | 1.87 | 5.61 | [1] 0 | |
| 567 | M | 15.1 | 2.26 | 6.78 | | 0 (15.6 kg.) |

[1] Necropsy.

In these treatments, most of the tapeworms were released and eliminated on the second day of treatment. All were eliminated by the third day, and none reappeared over at least a 6-weeks period as evidenced by careful examination at necropsy.

Similar treatments in which the second dose was not given until 48 hours after the first dose gave similar results on completion of the treatment except that when the treatment was not given the second day, some worms had worked their way into the dog's stomach and were regurgitated. The results of these treatments are tabulated below.

| Dog | Sex | Wt. (Kg.) at Worming | Daily Dosage, Ml. | Total of 3 doses | Results— Worms and Wts. after 8 wks. |
|---|---|---|---|---|---|
| 912 | M | 6.7 | 1.00 | 3.00 | 0 (7.1) |
| 915 | F | 4.8 | 0.72 | [1] 2.16 | +(6.4) |
| 931 | F | 8.9 | 1.33 | 3.99 | 0 (10.0) |
| 935 | M | 12.8 | 1.92 | 5.76 | 0 (12.4) |

[1] Second dosage partially lost due to regurgitation after administration

A similar treatment applied to sheep and to cows infested with worms has given substantial elimination of worms without harming the animals themselves. While complete freedom of worms was not determined, the well being of the animals was greatly increased.

The diethyltoluamide used in the treatments set forth above was a commercial grade of material containing a minimum of 86% m-isomer and up to 13% p-isomer. Of the various position isomers, the m-isomer is most effective when used in a pure state free of the other isomers. The m-isomer is also useful in admixture with the o-isomer as well as the p-isomer. When a mixture of isomers is used, however, it is preferred to use a mixture which contains a major amount of the m-isomer.

Since diethyltoluamides are relatively nontoxic materials, their action as a vermifuge is particularly surprising. While the initial effect on worms appears to be that of a vermifuge, it has a further effect of killing the worms and preventing their reproduction. This is evidenced by the absence of worms in dogs as long as 8 weeks after treatment. The diethyltoluamide treatment is particularly advantageous because of its low mammalian toxicity which allows a high degree of tolerance by the animals.

Other animals which are effectively treated for intestinal worms with diethyltoluamide include cows, sheep, horses and poultry.

What we claim and desire to protect by Letters Patent is:

1. An article of manufacture for treatment of domestic animals to eliminate intestinal parasitic worms therefrom which comprises diethyltoluamide completely enclosed in a nontoxic edible substantially digestible encapsulating carrier.

2. An article of manufacture of claim 1 in which the diethyltoluamide is diethyl m-toluamide.

3. The article of manufacture of claim 1 in which the diethyltoluamide is a mixture of diethyl m-toluamide and at least one other isomer of the ortho- and para-group thereof.

4. An article of manufacture for treatment of domestic animals to eliminate intestinal parasitic worms therefrom which comprises diethyltoluamide completely enclosed in a pharmaceutical capsule as a digestible encapsulating carrier therefor.

5. An article of manufacture of claim 4 in which the diethyltoluamide is a mixture of diethyl m-toluamide and at least one other isomer of the ortho- and para-group thereof.

6. An article of manufacture for treatment of domestic animals to eliminate intestinal parasitic worms therefrom which comprises diethyltoluamide enclosed in an enteric coating material as a digestible encapsulating container therefor.

7. An article of manufacture for treatment of domestic animals to eliminate intestinal parasitic worms therefrom which comprises diethyltoluamide in an amount in the range of 0.01–100 grams completely enclosed in a nontoxic edible substantially digestible encapsulating carrier.

8. A method for eliminating intestinal parasitic worms from domestic animals which comprises introducing per os into the intestinal tract of the animal a quantity, sufficient to provide a daily dose, within the range of 0.1 to 10 ml. per kg. of animal weight of diethyltoluamide.

9. The method of claim 8 in which the diethyltoluamide is a mixture of diethyl m-toluamide and at least one other isomer of the ortho- and para-group thereof.

References Cited in the file of this patent

UNITED STATES PATENTS 1,982,909     Flint _____ Dec. 4, 1934

OTHER REFERENCES

The Merck Index, seventh edition, 1960, p. 356, Merck and Co., Rahway, N.J.